United States Patent
Chen et al.

(10) Patent No.: US 10,181,941 B1
(45) Date of Patent: Jan. 15, 2019

(54) SAMPLING PHASE ADJUSTMENT DEVICE AND ADJUSTING METHOD THEREOF

(71) Applicants: GLOBAL UNICHIP CORPORATION, Hsinchu (TW); TAIWAN SEMICONDUCTOR MANUFACTURING CO., LTD., Hsinchu (TW)

(72) Inventors: Yu-Chu Chen, Hsinchu (TW); Wen-Juh Kang, Hsinchu (TW); Chen-Yang Pan, Hsinchu (TW)

(73) Assignees: GLOBAL UNICHIP CORPORATION, Hsinchu (TW); TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 15/983,107

(22) Filed: May 18, 2018

(30) Foreign Application Priority Data

Oct. 19, 2017 (CN) .......................... 2017 1 0976664

(51) Int. Cl.
    *H04L 7/00* (2006.01)
(52) U.S. Cl.
    CPC .......... *H04L 7/0062* (2013.01); *H04L 7/0083* (2013.01)
(58) Field of Classification Search
    CPC .............................. H04L 7/0062; H04L 7/0083
    USPC ......................................................... 375/371
    See application file for complete search history.

(56) References Cited

U.S. PATENT DOCUMENTS

| | | | | |
|---|---|---|---|---|
| 8,791,735 | B1* | 7/2014 | Shibasaki | H03L 7/0812 |
| | | | | 327/147 |
| 9,148,235 | B1* | 9/2015 | Kang | H04B 17/104 |
| 9,350,527 | B1* | 5/2016 | Masuda | H04L 7/0041 |
| 2010/0046683 | A1* | 2/2010 | Beukema | H04L 7/0062 |
| | | | | 375/355 |
| 2010/0135378 | A1* | 6/2010 | Lin | H04L 7/0025 |
| | | | | 375/233 |

\* cited by examiner

*Primary Examiner* — Helene Tayong
(74) *Attorney, Agent, or Firm* — CKC & Partners Co., Ltd.

(57) ABSTRACT

A sampling phase adjustment device and an adjusting method thereof are disclosed. Sampling phase adjustment device includes feedback summer, adaptive equalizer unit, clock and data recovery (CDR) circuit, data slicer, error slicer, sample calculator unit and enable circuit. The adjusting method is as follows: the data slicer and error slicer receive a sum value generated from the feedback summer, and generate a data signal and an error signal, respectively. The adaptive equalizer unit provides an equalizing signal to the feedback summer and a reference signal to the error slicer. The sample calculator unit generates a sampling adjustment signal based on the data signal and error signal. The CDR circuit is configured to output and adjust a clock signal based on the sampling adjustment signal and data signal. The enable circuit enables the adaptive equalizer unit and the sample calculator unit alternatively.

20 Claims, 9 Drawing Sheets

SAMPLING PHASE ADJUSTMENT DEVICE AND ADJUSTING METHOD THEREOF

RELATED APPLICATIONS

This application claims priority to China Application Serial Number 201710976664.5, filed Oct. 19, 2017, which is herein incorporated by reference.

BACKGROUND

Field of Invention

The present invention relates to a sampling device and a sampling method. More particularly, the present invention relates to a sampling phase adjustment device and a sampling phase adjustment method.

Description of Related Art

SerDes is a portmanteau of SERializer and DESerializer. It is a mainstream time-division multiplexing (TDM) point-to-point (P2P) serial communication technology. That is, multiple low-speed parallel signals are converted into high-speed serial signals at the transmitting end, and then transmitted via a transmission medium. Finally, the high-speed serial signals are reconverted into low-speed parallel signals at the receiving end.

As shown in FIG. 1, the eye pattern can be used for presenting a signal at the receiving end, and the update of horizontal opening is triggered by the bit rate. Under many different coding systems, the eye pattern looks like several eyes side by side.

However, the eye shape between two edges may not always be symmetrical, which means that the middle position between the two edges does not have the highest signal-to-noise ratio (SNR). In a modern SerDes design, how to find the optimum sampling phase to improve the bit error rate (BER) has become an important subject.

SUMMARY

The present invention provides a sampling phase adjustment device and a sampling phase adjustment method to solve the problems of the prior art.

A sampling phase adjustment device is provided. The sampling phase adjustment device comprises a feedback summer, an adaptive equalizer unit, a clock and data recovery circuit, a data slicer, an error slicer, a sample calculator unit, and an enable circuit. The feedback summer receives an input signal and an equalizing signal to generate a sum value. The adaptive equalizer unit is configured to generate the equalizing signal and a first reference signal. The clock and data recovery circuit is configured to provide first and second clock signals. The error slicer slices the sum value based on the first clock signal and the first reference signal ($V_{REF}$) to generate an error signal. The data slicer slices the sum value based on the first clock signal and a second reference signal ($V_F$) to generate a data signal. The sample calculator unit calculates a sampling adjustment signal based on the data signal and the error signal, and sends the sampling adjustment signal to the clock and data recovery circuit, so that the clock and data recovery circuit adjusts a phase of the first clock signal based on the sampling adjustment signal and the data signal. The enable circuit is configured to alternatively send an enable signal to the adaptive equalizer unit and the sample calculator unit so that the adaptive equalizer unit and the sample calculator unit operate alternatively.

The invention provides a sampling phase adjustment method comprising the steps of: computing an input signal and an equalizing signal to generate a sum value by using a feedback summer; computing to generate the equalizing signal and a first reference signal by using an adaptive equalizer unit; computing to generate a first clock signal by using a clock and data recovery circuit; slicing the sum value based on the first clock signal and the first reference signal to generate an error signal by using an error slicer; slicing the sum value based on the first clock signal and a second reference signal to generate a data signal by using a data slicer; calculating a sampling adjustment signal based on the data signal and the error signal by using a sample calculator unit, so that the clock and data recovery circuit adjusts a phase of the first clock signal based on the sampling adjustment signal and the data signal; and alternatively transmitting an enable signal to the adaptive equalizer unit and the sample calculator unit by using an enable circuit, so that the adaptive equalizer unit and the sample calculator unit operate alternatively.

In summary, the technical solution of the present invention has obvious advantages and beneficial effects as compared with the prior art. Through the sampling phase adjustment device and the sampling phase adjustment method according to the present invention, the data sampling phase is automatically adjusted to improve the bit error rate.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
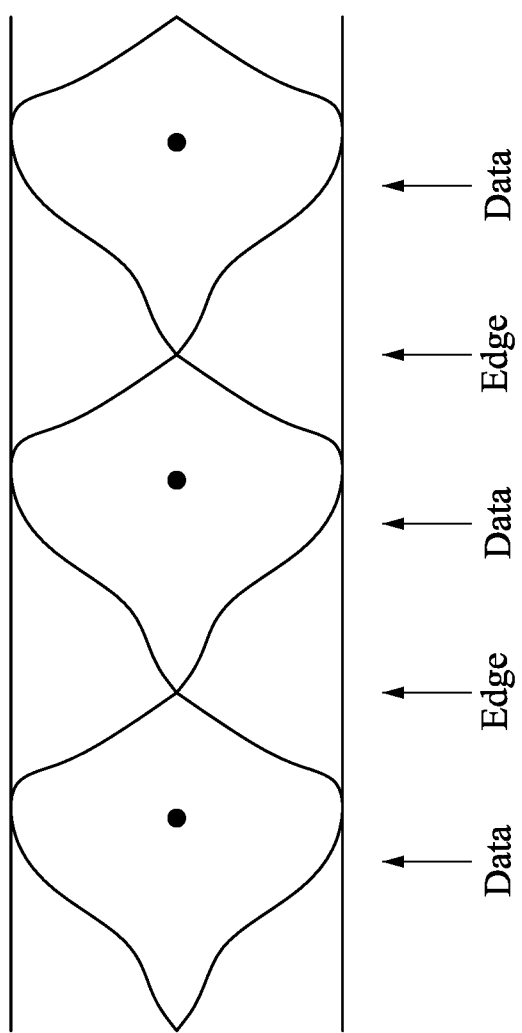
FIG. 1 depicts an eye pattern.

Reference will now be made in detail to the present embodiments of the invention, examples of which are illustrated in the accompanying drawings. Wherever possible, the same reference numbers are used in the drawings and the description to refer to the same or like parts. In other instances, well-known elements and steps are not described in the embodiments to avoid unnecessarily limiting the present invention.

Figure 2:
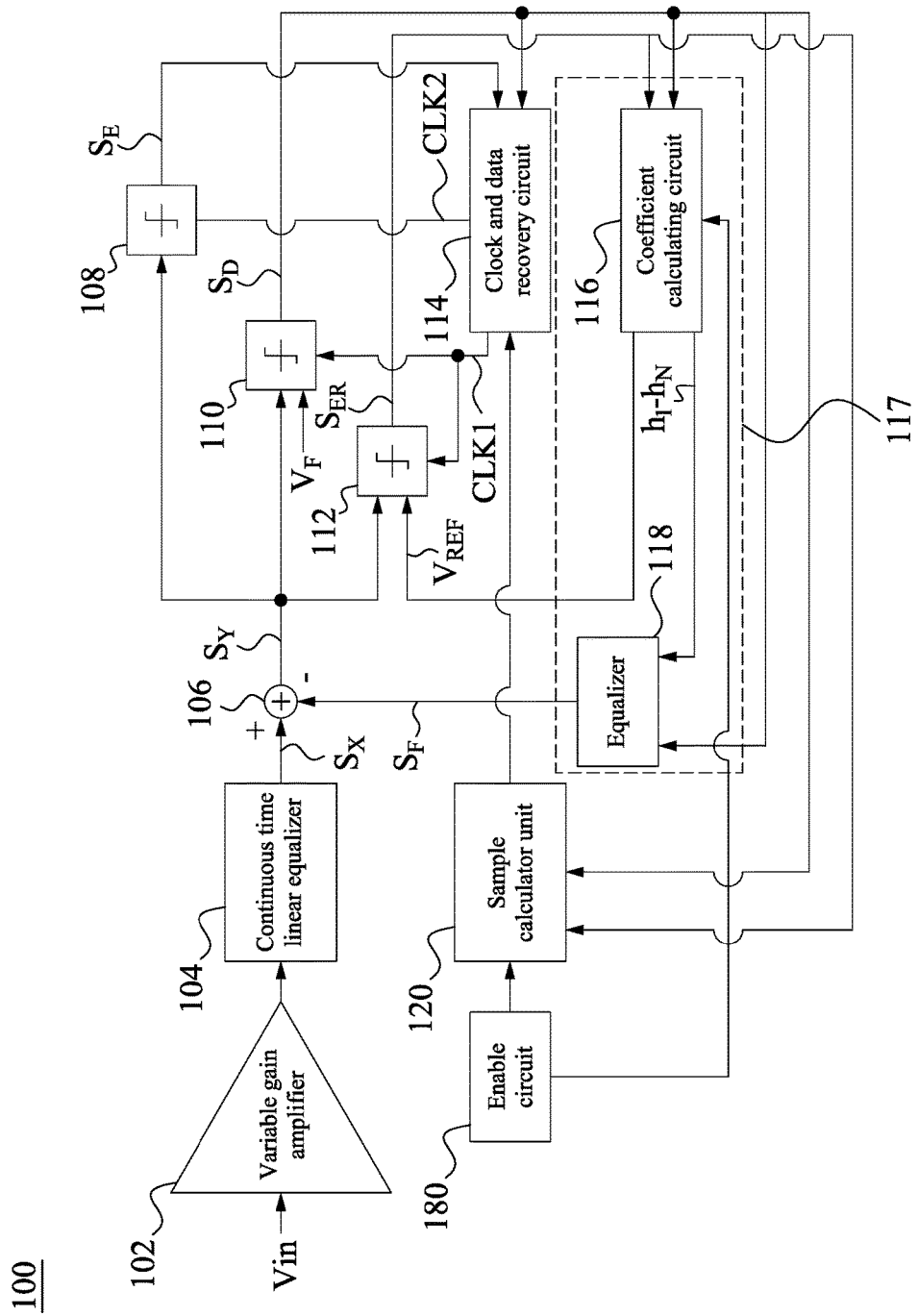
FIG. 2 depicts a block diagram of a sampling phase adjustment device according to one embodiment of this invention.

A description is provided with reference to FIG. 2. FIG. 2 depicts a block diagram of a sampling phase adjustment device 100 according to one embodiment of this invention. The sampling phase adjustment device 100 may be disposed in a receiving module of a transmission system. As shown in FIG. 2, the sampling phase adjustment device 100 comprises a feedback summer 106, a data slicer 110, an error slicer 112, a clock and data recovery (CDR) circuit 114, an adaptive equalizer unit 117, a sample calculator unit 120, and an enable circuit 180.

With additional reference to FIG. 2, the feedback summer 106 is coupled to an input end (not shown in the figure) and the adaptive equalizer unit 117. The feedback summer 106 receives an input signal $S_X$ from the input end, and receives an equalizing signal $S_F$ from the adaptive equalizer unit 117. The feedback summer 106 is configured to generate a sum value $S_Y$ corresponding to the equalizing signal $S_F$ and the input signal $S_X$. In greater detail, the feedback summer 106 may comprise a positive input terminal, a negative input terminal, and an output terminal. The positive input terminal is configured to receive the input signal $S_X$, and the negative input terminal is configured to receive the equalizing signal $S_F$. The feedback summer 106 generates and outputs the sum value $S_Y$ by subtracting the equalizing signal $S_F$ from the input signal $S_X$.

The data slicer 110 is coupled to the output terminal of the feedback summer 106. The data slicer 110 slices the sum value $S_Y$ in response to a first clock signal C L K 1 and a constant reference signal $V_F$ (such as 0 volt), and is configured to generate a data signal $S_D$. In greater detail, the data slicer 110 operates at the first clock signal C L K 1 to sample the sum value $S_Y$, and determines a logic value of a sample to generate the data signal $S_D$ accordingly. For example, the data slicer 110 compares each sample of the sum value $S_Y$ with the constant reference signal $V_F$ to determine whether each sample of the sum value $S_Y$ is greater than the constant reference signal $V_F$ or not. If the sample of the sum value $S_Y$ is greater than the constant reference signal $V_F$, the data slicer 110 sets the sample of the sum value $S_Y$ to be equal to logic "1". Otherwise, the data slicer 110 sets the sample of the sum value $S_Y$ to be equal to logic "0".

The error slicer 112 is coupled to the output terminal of the feedback summer 106. The error slicer 112 slices the sum value $S_Y$ in response to the first clock signal C L K 1 and a reference signal $V_{R\ E\ F}$, and is configured to generate an error signal $S_{E\ R}$. In greater detail, the error slicer 112 operates at the first clock signal C L K 1 to sample the sum value $S_Y$, and determines a logic value of a sample to generate the error signal $S_{E\ R}$ accordingly. For example, the error slicer 112 compares each sample of the sum value $S_Y$ with the reference signal $V_{R\ E\ F}$ to determine whether each sample of the sum value $S_Y$ is greater than the reference signal $V_{R\ E\ F}$ or not. If the sample of the sum value $S_Y$ is greater than the reference signal $V_{R\ E\ F}$, the error slicer 112 sets the sample of the sum value $S_Y$ to be equal to logic "1". Otherwise, the error slicer 112 sets the sample of the sum value $S_Y$ to be equal to logic "0".

The adaptive equalizer unit 117 is coupled to the data slicer 110, the error slicer 112, and the feedback summer 106, and is configured to receive the data signal $S_D$ and the error signal $S_{E\ R}$ and generate the reference signal $V_{R\ E\ F}$ and the equalizing signal $S_F$. The reference signal $V_{R\ E\ F}$ is transmitted to the error slicer 112. The equalizing signal $S_F$ is transmitted to the feedback summer 106.

The adaptive equalizer unit 117 comprises a coefficient calculating circuit 116 and an equalizer 118. The coefficient calculating circuit 116 receives the data signal $S_D$ and the error signal $S_{E\ R}$, and is configured to generate the reference signal $V_{R\ E\ F}$ and a set of equalizer coefficients $h_1$-$h_N$. The coefficient computing circuit 116 may be implemented as a number of adaptive loops. The adaptive loops are configured to determine a value of the reference signal $V_{R\ E\ F}$ and the equalizer coefficients $h_1$-$h_N$. In other words, the coefficient calculating circuit 116 can dynamically adjust the reference signal $V_{R\ E\ F}$ and the equalizer coefficients $h_1$-$h_N$. In some embodiments, the coefficient calculating circuit 116 is configured to execute an adaptive algorithm, such as a least mean square (LMS) algorithm.

The equalizer 118 is coupled to the data slicer 110, the coefficient calculating circuit 116, and the feedback summer 106. The equalizer 118 receives the data signal $S_D$ and the equalizer coefficients $h_1$-$h_N$, and is configured to generate the equalizing signal $S_F$. The equalizing signal $S_F$ is configured to eliminate a post-cursor of the input signal $S_X$. For example, the equalizer 118 may be a decision feedback equalizer (DFE), and the relationship between the equalizing signal $S_F$, the data signal $S_D$, and the equalizer coefficients $h_1$-$h_N$ can be shown in equation (1):

$$S_F[k] = \sum_{i=1}^{N} h_i \cdot S_D[k-i] \qquad (1)$$

Where [k−i] is $i_{th}$ delay sampling of a signal $S_D$ [k]. Therefore, the relationship between the sum value $S_Y$, the equalizing signal $S_F$, and the input signal $S_X$ is shown in equation (2):

$$S_Y[k] = S_X[k] - S_F[k] = S_X[k] - \sum_{i=1}^{N} h_i \cdot S_D[k-i] \qquad (2)$$

The sample calculator unit 120 is coupled to the data slicer 110, the error slicer 112, and the clock and data recovery circuit 114, and is configured to receive the data signal $S_D$ and the error signal $S_{E\ R}$ and generate a sampling adjustment signal. The sampling adjustment signal is transmitted to the clock and data recovery circuit 114. In greater detail, when the sample calculator unit 120 is enabled to operate, the adaptive equalizer unit 117 is in a disabled state. At this time, the sample calculator unit 120 calculates the sampling adjustment signal based on the data signal $S_D$ and the error signal $S_{E\ R}$ and sends the sampling adjustment signal to the clock and data recovery circuit 114, so that the clock and data recovery circuit 114 is able to adjust a data sampling point based on the sampling adjustment signal.

The clock and data recovery circuit 114 is coupled to the data slicer 110, the edge slicer 108 and the sample calculator unit 120. The clock and data recovery circuit 114 receives the data signal $S_D$, the edge signal $S_E$ and the sampling adjustment signal, and is configured to adjust a phase of the first clock signal C L K 1, that is, the above-mentioned data sampling point, based on the data signal $S_D$, the edge signal $S_E$ and the sampling adjustment signal.

Figure 8:
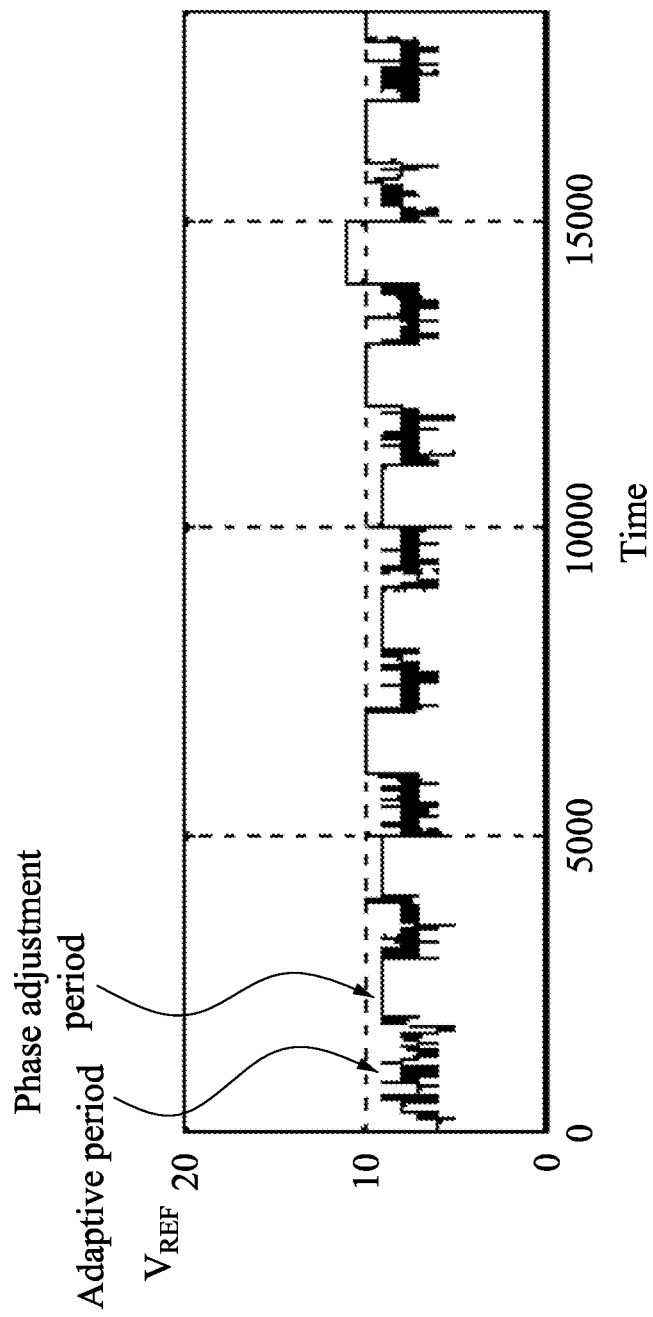
FIG. 8 depicts a timing diagram of a reference level according to one embodiment of this invention.

The enable circuit 180 is coupled to the adaptive equalizer unit 117 and the sample calculator unit 120, and is configured to periodically transmit an enable signal to the adaptive equalizer unit 117 and the sample calculator unit 120, so that the adaptive equalizer unit 117 and the sample calculator unit 120 operate alternatively. A description is provided with reference to FIG. 2 and FIG. 8, during an enabled operation of the adaptive equalizer unit 117, the sample calculator unit 120 is in a disabled state. At this time, the adaptive equalizer unit 117 enters an adaptive period to generate the variable reference signal $V_{REF}$. In addition, during a disabled operation of the adaptive equalizer unit 117, the sample calculator unit 120 is enabled to enter a phase adjustment period. At this time, the adaptive equalizer unit 117 is in a disabled state so that the constant reference signal $V_{REF}$ is generated.

With additional reference to FIG. 2, the sampling phase adjustment device 100 may selectively comprise one of a variable gain amplifier (VGA) 102, a continuous time linear equalizer (CTLE) 104, and an edge slicer 108, or a combination thereof, depending on practical design needs of the receiving module.

The variable gain amplifier 102 is configured to receive an input signal Vin from a transmission channel and amplify the input signal Vin. In particular, the variable gain amplifier 102 amplifies the input signal Vin based on a variable gain factor. The continuous time linear equalizer 104 is coupled between the variable gain amplifier 102 and the feedback summer 106, and is configured to equalize the amplified input signal Vin. In particular, the continuous time linear equalizer 104 is configured to increase the amplitude of a high-frequency component of the input signal Vin. In this manner, the input signal Vin is amplified and compensated by a high-frequency signal to become the input signal $S_X$ sent to the feedback summer 106.

The edge slicer 108 is coupled to the feedback summer 106 and the clock and data recovery circuit 114. The edge slicer 108 receives the sum value $S_Y$ from the feedback summer 106, and receives a second clock signal C L K 2 from the clock and data recovery circuit 114. The edge slicer 108 slices the sum value $S_Y$ based on the second clock signal C L K 2 to generate an edge signal $S_E$, and transmits the edge signal $S_E$ to the clock and data recovery circuit 114. In greater detail, the edge slicer 108 detects an edge of the sum value $S_Y$, and samples the sum value $S_Y$ at a transition time of the second clock signal C L K 2 to generate the edge signal $S_E$. As mentioned above, the clock and data recovery circuit 114 may comprise a bang-bang phase detector (also referred to as an Alexander phase detector), which is configured to receive the data signal $S_D$ and the edge signal $S_E$ so as to generate phase update information for adjusting the first clock signal C L K 1 and the second clock signal C L K 2 correspondingly.

Figure 3:
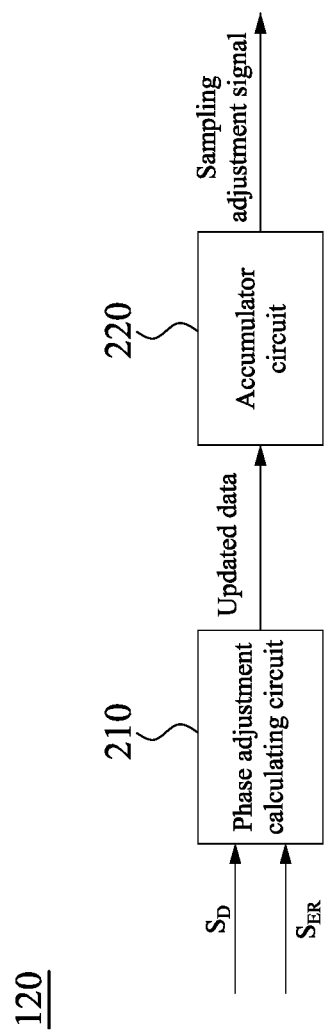
FIG. 3 depicts a block diagram of a sample calculator unit according to one embodiment of this invention.

In order to further illustrate the above sample calculator unit 120, a description is provided with reference to FIG. 2 and FIG. 3. FIG. 3 depicts a block diagram of the sample calculator unit 120 according to one embodiment of this invention. As shown in FIG. 3, the sample calculator unit 120 comprises a phase adjustment calculating circuit 210 and an accumulator circuit 220. As for the structure, the accumulator circuit 220 is coupled to the phase adjustment calculating circuit 210.

Figure 4:
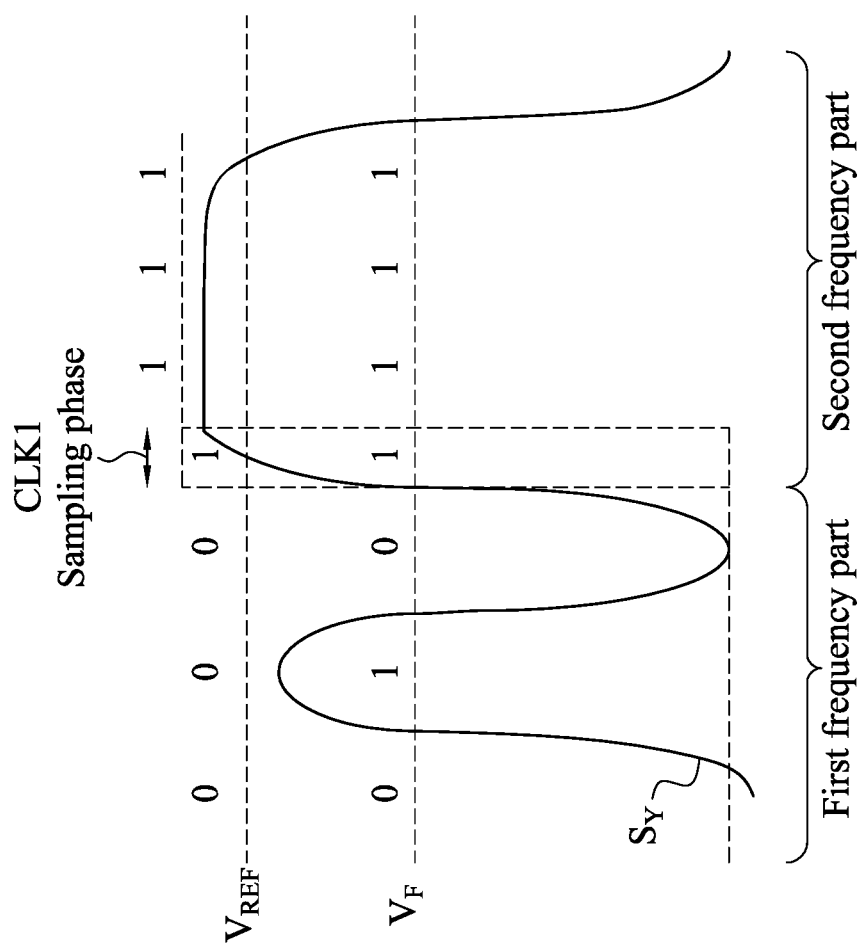
FIG. 4 depicts a waveform of a data signal according to one embodiment of this invention.

In the present embodiment, the data signal $S_D$ comprises a plurality of first bits, the error signal $S_{ER}$ comprises a plurality of second bits. A description is provided with reference to FIG. 3 to FIG. 6. The sum value $S_Y$ comprises a first frequency part and a second frequency part. As shown in FIG. 4, the sum value $S_Y$ is transformed from the first frequency part (such as a high-frequency part) into the second frequency part (such as a low-frequency part). The data slicer 110 slices the sum value $S_Y$ in response to the first clock signal C L K 1 and the constant reference signal $V_F$, and is configured to generate the data signal $S_D$ in which the plurality of first bits are "0101111 (B7~B1)". The first three first bits "010" correspond to the high-frequency part (that is, trough, crest, trough), and the last four first bits "1111" correspond to the low-frequency part (that is, a fixed high level). In greater detail, when a level of the sum value $S_Y$ is higher than the constant reference signal $V_F$, the data slicer 110 generates the first bit of logic "1". Otherwise, the data slicer 110 generates the first bit of logic "0". The above data signal $S_D$ having seven first bits is taken as an example.

Additionally, the error slicer 112 slices the sum value $S_Y$ in response to the first clock signal C L K 1 and the reference signal $V_{REF}$, and is configured to generate the error signal $S_{ER}$ in which the plurality of second bits are "0001111 (b7~b1)". The first three second bits "000" correspond to the high-frequency part (that is, trough, crest, trough), and the last four second bits "1111" correspond to the low-frequency part (that is, the fixed high level). In greater detail, when the level of the sum value $S_Y$ is higher than the reference signal $V_{REF}$, the error slicer 112 generates the second bit of logic "1". Otherwise, the error slicer 112 generates the second bit of logic "0". The above error signal $S_{ER}$ having seven second bits is taken as an example, and the second bit in the middle (b4) is used as a basis for sampling phase adjustment of the first clock signal C L K 1.

Figure 5:
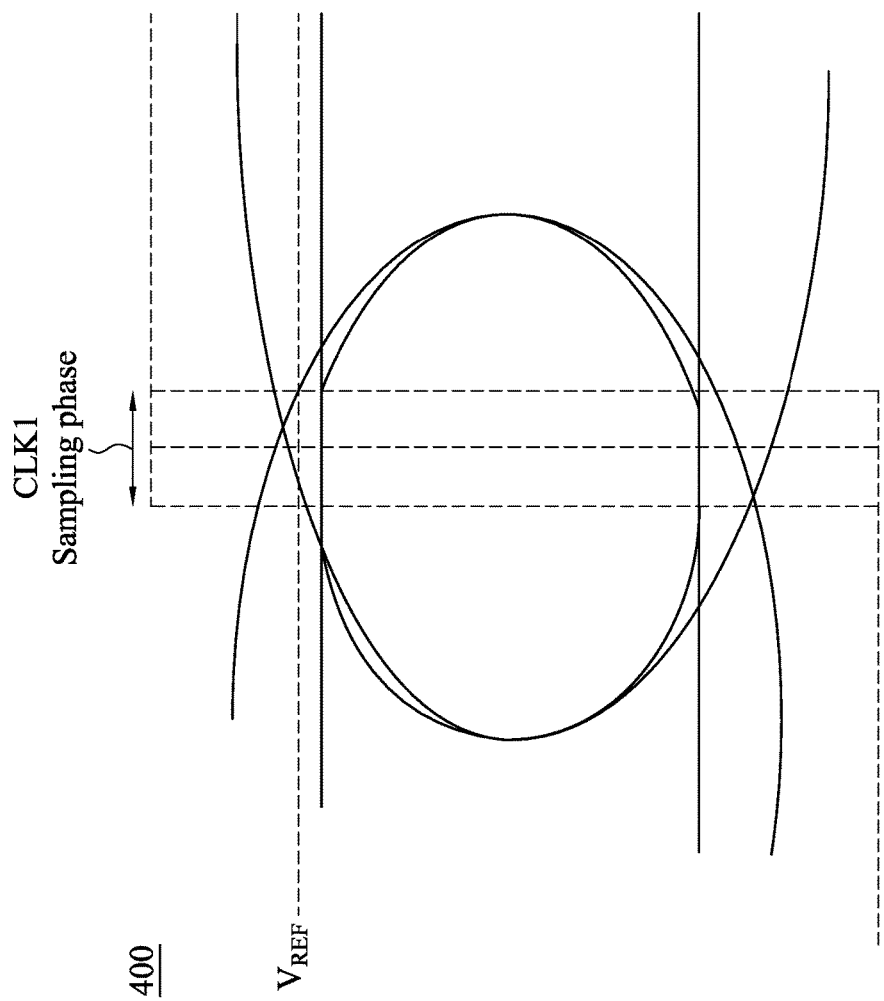
FIG. 5 depicts an eye pattern according to one embodiment of this invention.

The phase adjustment calculating circuit 210 provides updated data based on similarities and differences between the first bits and the second bits. The accumulator circuit 220 accumulates the updated data and compares the accumulative value with a threshold value to output the sampling adjustment signal accordingly. As a result, the sampling phase of the first clock signal C L K 1 in an eye pattern 400 of FIG. 5 is adjusted.

In addition to that, according to the present embodiment, the first frequency part is the high-frequency part, and the second frequency part is the low-frequency part. However, the present invention is not limited in this regard. In other embodiments, the first frequency part may be the low-frequency part, and the second frequency part may be the high-frequency part.

Figure 6:
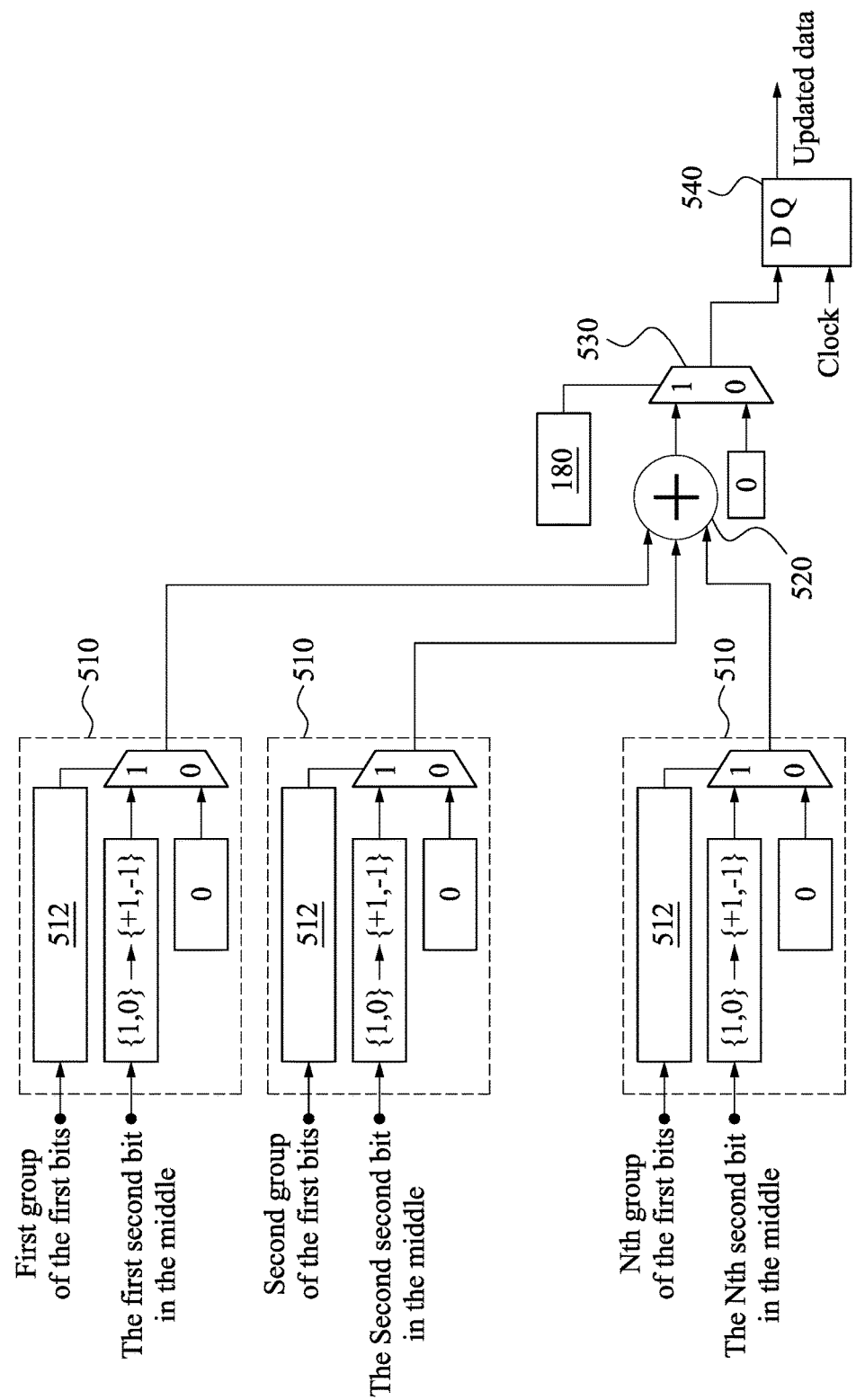
FIG. 6 depicts a block diagram of a phase adjustment calculating circuit according to one embodiment of this invention.

In order to further illustrate the phase adjustment calculating circuit 210, a description is provided with reference to FIG. 6. FIG. 6 depicts a block diagram of the phase adjustment calculating circuit 210 according to one embodiment of this invention. As shown in FIG. 6, the phase adjustment calculating circuit 210 comprises a plurality of detectors 510, an operator 520, a multiplexer 530, and a D-type flip-flop 540. As for the structure, the detectors 510 are electrically connected to the operator 520, the operator 520 is electrically connected to the multiplexer 530, and the multiplexer 530 is electrically connected to the D-type flip-flop 540. As mentioned above, a number of the detectors 510 may be determined depending on practical design needs.

The phase adjustment calculating circuit 210 receives the plurality of first bits, the plurality of first bits are divided into a plurality of groups of first bits based on a bit number of example bits, and the phase adjustment calculating circuit 210 compares the plurality of groups of first bits. For example, a number of the plurality of first bits is 15 (B15-B1), and a number of the sample bits is 7. Therefore, the plurality of first bits can be divided into 9 groups of first bits (each one group comprises seven first bits). A first group of the first bits are fetched from a first to a seventh bits (B7-B1) of the 15 first bits (B15-B1), a second group of the first bits are fetched from a second to an eighth bits (B8-B2) of the 15 first bits (B15-B1), a third group of the first bits are fetched from a third to a ninth bits (B9-B3) of the 15 first bits (B15-B1), and so forth.

In addition, a number of the plurality of second bits is similarly 15 (b15-b1), and the plurality of second bits are similarly divided into 9 groups of second bits (each one group comprises seven second bits) based on the number of the sample bits, which is 7. The phase adjustment calculating circuit 210 is configured to receive the second bit in the middle of each group of the second bits (such as the fourth bit of the seven bits), and determine whether the second bit in the middle is the same as a bit in a middle of the sample bits. As mentioned above, a bit number of each group of the first bits is the same as a bit number of each group of the second bits.

When the phase adjustment calculating circuit 210 operates, each of the detectors 510 receives one group of the first bits and the second bit in the middle of one group of the second bits, correspondingly. In greater detail, each of the detectors 510 comprises a mode comparator 512 and a multiplexer 514. When the mode comparator 512 compares and finds that the first bits of the corresponding group are the same as at least one group of the example bits, the mode comparator 512 outputs a selection signal to the multiplexer 514 to control the multiplexer 514 to output an output signal correspondingly.

As for types of the output signal, for example, a description is provided with reference to the following table:

|  | The second bit in the middle | |
| --- | --- | --- |
| Sample bits | 1 | 0 |
| 1101111 | Plus one | Minus one |
| 0101111 | Plus one | Minus one |
| 1001111 | Plus one | Minus one |
| 0010000 | Minus one | Plus one |
| 1010000 | Minus one | Plus one |
| 0110000 | Minus one | Plus one |

It can be seen from the above table that whenever the corresponding second bit in the middle is the same as the second bit in the middle of the group of the sample bits, the output signal is a plus one (+1) signal. Whenever the corresponding second bit in the middle is not the same as the second bit in the middle of the group of the sample bits, the output signal is a minus one (−1) signal.

The operator 520 is coupled to each of the detectors 510 to collect the output signal (for example, plus one signal, minus one signal) sent from each of the detectors 510 so as to generate the updated data. In one embodiment, the operator 520 is implemented by using an adder.

The multiplexer 530 is coupled to the operator 520, the enable circuit 180, and the D-type flip-flop 540. The multiplexer 530 transmits the updated data generated by the operator 520 to the D-type flip-flop 540 based on the enable signal transmitted from the enable circuit 180. Then, the D-type flip-flop 540 transmits the updated data to the backend accumulator circuit 220 (as shown in FIG. 3).

Figure 7:
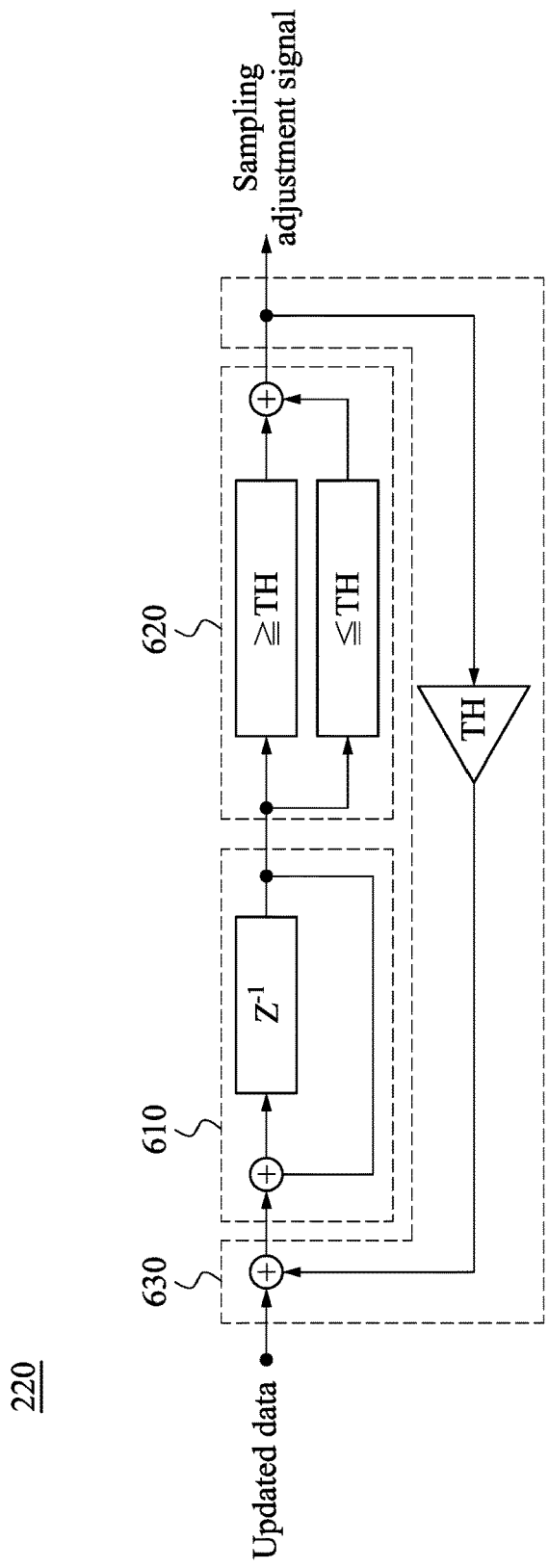
FIG. 7 depicts a block diagram of an accumulator circuit according to one embodiment of this invention.

In order to further illustrate the above accumulator circuit 220, a description is provided with reference to FIG. 7. FIG. 7 depicts a block diagram of the accumulator circuit 220 according to one embodiment of this invention. As shown in FIG. 7, the accumulator circuit 220 comprises an integrator 610, a comparator 620, and a feedback path 630. As for the structure, the comparator 620 is coupled to the integrator 610. The feedback path 630 is coupled to the comparator 620 and the integrator 610.

When the accumulator circuit 220 operates, the integrator 610 obtains the updated data from the phase adjustment calculating circuit 210, and accumulates the updated data to obtain a cumulative value. If the cumulative value is a positive number, the comparator 620 determines whether the cumulative value is greater than or equal to a positive threshold value (TH) or not. Or, if the cumulative value is negative, the comparator 620 determines whether the cumulative value is less than or equal to a negative threshold value (−TH) or not. When the cumulative value is greater than or equal to the positive threshold value (TH) or less than or equal to the negative threshold value (−TH), the phase of the current first clock signal C L K 1 generated by the clock and data recovery circuit 114 is not at an optimum data sampling point. At this time, the comparator 620 outputs the sampling adjustment signal to the clock and data recovery circuit 114. The clock and data recovery circuit 114 adjusts the phase of the first clock signal C L K 1 in response to the received data signal $S_D$ and sampling adjustment signal.

In addition to that, the feedback path 630 resets the integrator 610 based on an output of the sampling adjustment signal, so that the integrator 601 re-accumulates the updated data.

For example, if the cumulative value is greater than or equal to the positive threshold value (TH), the sampling adjustment signal is the plus one (+1) signal. Or, if the cumulative value is less than or equal to the negative threshold value (−TH), the sampling adjustment signal is the minus one (−1) signal. The clock and data recovery circuit 114 adjusts the phase of the first clock signal C L K 1 based on the plus one signal or the minus one signal so as to determine whether the data sampling point is adjusted leftward or rightward along phase timing of the first clock signal C L K 1.

Figure 9:
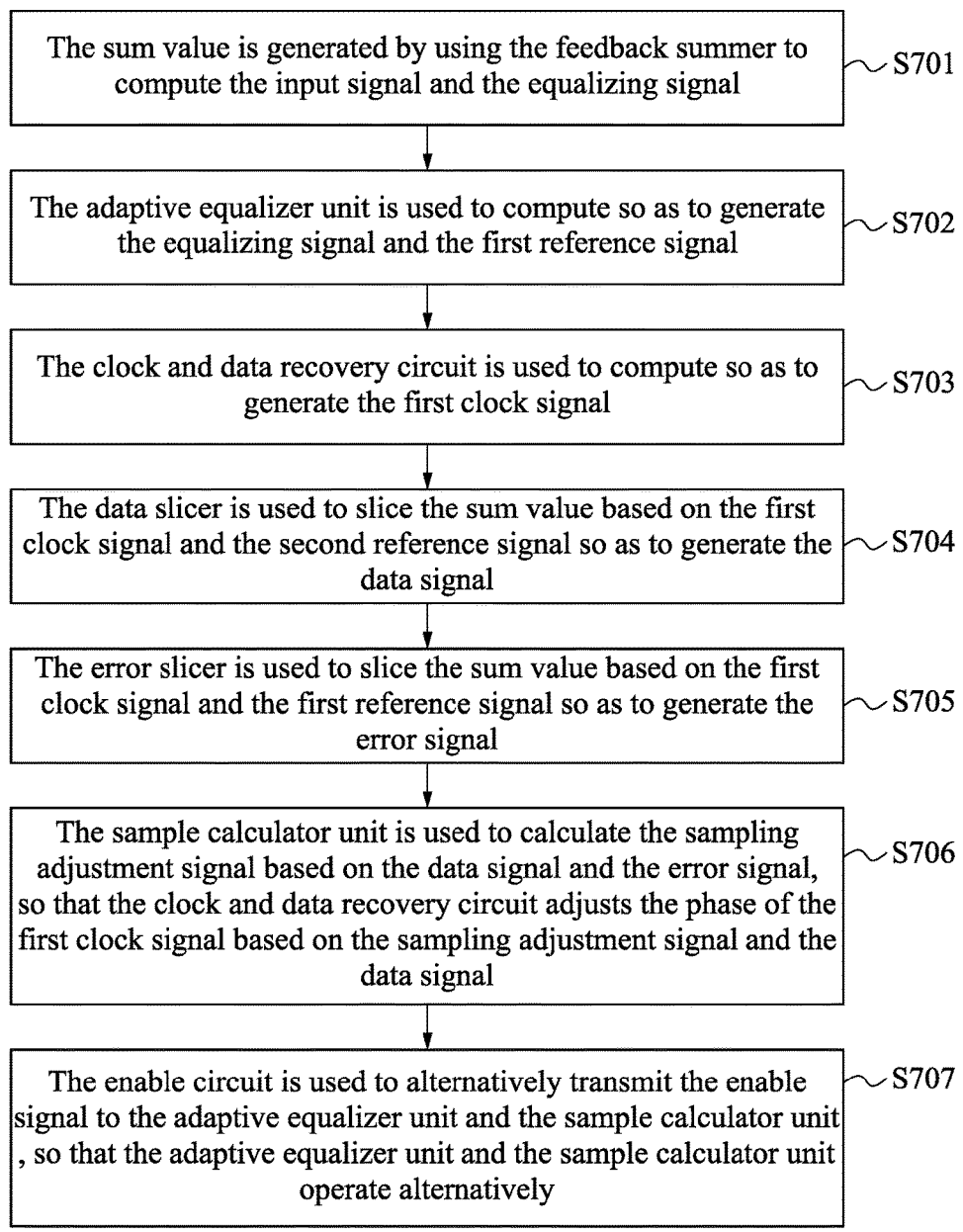
FIG. 9 depicts a flowchart of a sampling phase adjustment method according to one embodiment of this invention.

In order to further illustrate the sampling phase adjustment method executed by the above sampling phase adjustment device 100, a description is provided with reference to FIG. 9. FIG. 9 depicts a flowchart of a sampling phase adjustment method 700 according to one embodiment of this invention. As shown in FIG. 9, the sampling phase adjustment method 700 comprises steps S701, S802, S703, S704, S705, S706 and S707 (it should be understood that the step sequence mentioned in the present embodiment may be adjusted depending on practical needs unless otherwise specified, and the steps may even be performed simultaneously or partially simultaneously). The technical scheme of the present invention will be illustrated as follows with reference to FIG. 1 to FIG. 9.

In step S701, the sum value $S_Y$ is generated by using the feedback summer 106 to compute the input signal $S_X$ and the equalizing signal $S_F$. In step S702, the adaptive equalizer unit 117 is used to compute so as to generate the equalizing signal $S_F$ and the first reference signal $V_{REF}$. In step S703, the clock and data recovery circuit 114 is used to compute so as to generate the first clock signal C L K 1. In step S704, the data slicer 110 is used to slice the sum value $S_Y$ in response to the first clock signal C L K 1 and the second reference signal $V_F$ so as to generate the data signal $S_D$. In step S705, the error slicer 112 is used to slice the sum value $S_Y$ in response to the first clock signal C L K 1 and the first reference signal $V_{REF}$ so as to generate the error signal $S_{ER}$. In step S706, the sample calculator unit 120 is used to calculate out the sampling adjustment signal based on the data signal $S_D$ and the error signal $S_{ER}$, so that the clock and data recovery circuit 114 adjusts the phase of the first clock signal C L K 1 based on the sampling adjustment signal and the data signal $S_D$. In step S707, the enable circuit 180 is used to alternatively transmit the enable signal to the adaptive equalizer unit 117 and the sample calculator unit 120, so that the adaptive equalizer unit 117 and the sample calculator unit 120 operate alternatively.

According to one embodiment of the present invention, in the sampling phase adjustment method 700, the data signal comprising the plurality of first bits is divided into the plurality of groups of first bits, and the error signal comprising the plurality of second bits is divided into the plurality of groups of second bits. The data signal $S_D$ and the error signal $S_{ER}$ are operated to generate the updated data by using the phase adjustment calculating circuit 210 and based on similarities and differences between the plurality of first bits and the plurality of second bits. The updated data is accumulated and compared with the threshold value by using the accumulator circuit 220 so as to generate the sampling adjustment signal.

According to one embodiment of the present invention, in the sampling phase adjustment method 700, one group of the first bits and the second bit in the middle of one group of the second bits are correspondingly received and compared with the sample bits by using each of the detectors 510 to generate the plurality of output signals. The plurality of output signals are computed by using the operator 520 to generate the updated data, and the updated data is sent to a back end for processing by using the first multiplexer 530 based on the enable signal.

According to one embodiment of the present invention, in the sampling phase adjustment method 700, the output signal is generated by the second multiplexer 514 based on the selection signal, and the example bits are compared with the one group of the first bits and the selection signal is generated when the sample bits are the same as the one group of the first bits by using the mode comparator 512.

According to one embodiment of the present invention, in the sampling phase adjustment method 700, the integrator 610 is used to accumulate the updated data so as to generate the cumulative value. The comparator 620 is used to compare the cumulative value with the threshold value and generate the sampling adjustment signal when the cumulative value reaches the threshold value, and the feedback path 630 is used to reset the integrator 610 when the cumulative value reaches the threshold value.

In summary, the technical solution of the present invention has obvious advantages and beneficial effects as compared with the prior art. Through the sampling phase adjustment device 100 and the sampling phase adjustment method 700 according to the present invention, the data sampling phase is automatically adjusted to improve the bit error rate.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A sampling phase adjustment device comprising:
   a feedback summer receiving an input signal and an equalizing signal, and generating a sum value based on the input signal and the equalizing signal;
   an adaptive equalizer unit coupled to the feedback summer, the adaptive equalizer unit generating the equalizing signal and a first reference signal;
   a clock and data recovery circuit providing a first clock signal;
   a data slicer coupled to the clock and data recovery circuit and the feedback summer, the data slicer slicing the sum value based on the first clock signal and a second reference signal to generate a data signal;
   an error slicer coupled to the clock and data recovery circuit, the feedback summer, and the adaptive equalizer unit, the error slicer slicing the sum value based on the first clock signal and the first reference signal to generate an error signal;
   a sample calculator unit coupled to the clock and data recovery circuit, the data slicer, and the error slicer, the sample calculator unit calculating out a sampling adjustment signal based on the data signal and the error signal, and sending the sampling adjustment signal to the clock and data recovery circuit, so that the clock and data recovery circuit adjusts a phase of the first clock signal based on the sampling adjustment signal and the data signal; and
   an enable circuit coupled to the adaptive equalizer unit and the sample calculator unit, the enable circuit alternatively sending an enable signal to the adaptive equalizer unit and the sample calculator unit so that the adaptive equalizer unit and the sample calculator unit operate alternatively.

2. The sampling phase adjustment device of claim 1, wherein the adaptive equalizer unit generates a variable first reference signal during an enabled operation of the adaptive equalizer unit, and generates a constant first reference signal during a disabled operation of the adaptive equalizer unit.

3. The sampling phase adjustment device of claim 1, wherein the sample calculator unit sends the sampling adjustment signal to the clock and data recovery circuit during an enabled operation.

4. The sampling phase adjustment device of claim 1, wherein the adaptive equalizer unit comprises:
   a coefficient calculating circuit coupled to the data slicer and the error slicer, the coefficient calculating circuit receiving the data signal and the error signal, and being configured to generate the first reference signal and a set of equalizer coefficients; and
   an equalizer coupled to the data slicer, the coefficient calculating circuit, and the feedback summer, the equalizer receiving the data signal and the set of equalizer coefficients, and being configured to generate the equalizing signal.

5. The sampling phase adjustment device of claim 1, wherein the sum value comprises a first frequency part and a second frequency part.

6. The sampling phase adjustment device of claim 1, wherein the data signal comprises a plurality of first bits, and the first bits are divided into a plurality of groups of first bits, the error signal comprises a plurality of second bits, and the second bits are divided into a plurality of groups of second bits.

7. The sampling phase adjustment device of claim 6, wherein the sample calculator unit comprises:

a phase adjustment calculating circuit coupled to the data slicer and the error slicer, the phase adjustment calculating circuit receiving the data signal and the error signal and providing updated data based on similarities and differences between the first bits and the second bits;

an accumulator circuit coupled to the phase adjustment calculating circuit, the accumulator circuit accumulating the updated data and comparing accumulated updated data with a threshold value to output the sampling adjustment signal accordingly.

8. The sampling phase adjustment device of claim 7, wherein the phase adjustment calculating circuit sends the updated data to the accumulator circuit during an enabled operation.

9. The sampling phase adjustment device of claim 7, wherein the phase adjustment calculating circuit comprises:
   a plurality of detectors coupled to the data slicer and the error slicer, wherein one group of the first bits and the second bit in a middle of one group of the second bits are correspondingly received and compared with sample bits by each of the detectors to generate an output signal;
   an operator coupled to the plurality of detectors, the operator receiving a plurality of output signals to generate the updated data; and
   a first multiplexer coupled to the operator, the enable circuit, and a D-type flip-flop, wherein the first multiplexer sends the updated data to the accumulator circuit through the D-type flip-flop based on the enable signal.

10. The sampling phase adjustment device of claim 9, wherein a number of the sample bits is the same as a number of the first bits in each group or a number of the second bits in each group.

11. The sampling phase adjustment device of claim 10, wherein the detector comprises:
   a second multiplexer coupled to the error slicer and the operator, the second multiplexer outputting the output signal based on a selection signal; and
   a mode comparator coupled to the data slicer and the second multiplexer, the mode comparator comparing the sample bits and the one group of the first bits and outputting the selection signal when the sample bits and the one group of the first bits are the same.

12. The sampling phase adjustment device of claim 7, wherein the accumulator circuit comprises:
   an integrator coupled to the phase adjustment calculating circuit, the integrator accumulating the updated data to generate a cumulative value;
   a comparator coupled to the integrator, the comparator comparing the cumulative value with the threshold value, and outputting the sampling adjustment signal when the cumulative value reaches the threshold value; and
   a feedback path coupled to the integrator and the comparator, the feedback path resetting the integrator when the cumulative value reaches the threshold value.

13. The sampling phase adjustment device of claim 1, further comprising a variable gain amplifier, the variable gain amplifier is coupled to the feedback summer and is configured to amplify the input signal based on a variable gain factor.

14. The sampling phase adjustment device of claim 1, further comprising a continuous time linear equalizer, the continuous time linear equalizer is coupled to the feedback summer and provides the input signal with a high-frequency signal compensation.

15. The sampling phase adjustment device of claim 1, further comprising an edge slicer, the edge slicer is coupled to the clock and data recovery circuit and the feedback summer, the edge slicer receiving a second clock signal from the clock and data recovery circuit and receiving the sum value from the feedback summer, the edge slicer slicing the sum value based on the second clock signal to generate an edge signal, and transmitting the edge signal to the clock and data recovery circuit.

16. A sampling phase adjustment method comprising the steps of:
   computing an input signal and an equalizing signal to generate a sum value by using a feedback summer;
   computing to generate the equalizing signal and a first reference signal by using an adaptive equalizer unit;
   computing to generate a first clock signal by using a clock and data recovery circuit;
   slicing the sum value based on the first clock signal and a second reference signal to generate a data signal by using a data slicer;
   slicing the sum value based on the first clock signal and the first reference signal to generate an error signal by using an error slicer;
   calculating a sampling adjustment signal based on the data signal and the error signal by using a sample calculator unit, so that the clock and data recovery circuit adjusts a phase of the first clock signal based on the sampling adjustment signal and the data signal; and
   alternatively transmitting an enable signal to the adaptive equalizer unit and the sample calculator unit by using an enable circuit, so that the adaptive equalizer unit and the sample calculator unit operate alternatively.

17. The sampling phase adjustment method of claim 16, further comprising:
   dividing the data signal comprising a plurality of first bits into a plurality of groups of first bits;
   dividing the error signal comprising a plurality of second bits into a plurality of groups of second bits;
   operating the data signal and the error signal to generate updated data by using a phase adjustment calculating circuit and based on similarities and differences between the first bits and the second bits; and
   accumulating the updated data and comparing accumulated updated data with a threshold value to generate the sampling adjustment signal by using an accumulator circuit.

18. The sampling phase adjustment method of claim 17, further comprising:
   receiving one group of the first bits and the second bit in a middle of one group of the second bits correspondingly and comparing the one group of the first bits and the second bit in the middle of the one group of the second bits with sample bits by using each of a plurality of detectors to generate a plurality of output signals;
   computing the plurality of output signals to generate the updated data by using an operator, and
   sending the updated data to a back end for processing based on the enable signal by using a first multiplexer.

19. The sampling phase adjustment method of claim 18, further comprising:
   generating the output signal based on a selection signal by using a second multiplexer; and
   comparing the sample bits with the one group of the first bits and generating the selection signal when the sample bits are the same as the one group of the first bits by using a mode comparator.

20. The sampling phase adjustment method of claim 17, further comprising:
- accumulating the updated data to generate a cumulative value by using an integrator;
- comparing the cumulative value with the threshold value and generating the sampling adjustment signal when the cumulative value reaches the threshold value by using a comparator; and
- resetting the integrator when the cumulative value reaches the threshold value by using a feedback path.

* * * * *